United States Patent Office 2,972,565
Patented Feb. 21, 1961

2,972,565
FAT COMPOSITION

Donald B. Zilversmit, Memphis, Tenn., assignor to The University of Tennessee Research Corporation, Knoxville, Tenn., a non-profit corporation of Tennessee No Drawing. Filed Apr. 4, 1958, Ser. No. 726,344

1 Claim. (Cl. 167—66)

This invention relates to a stable non-toxic fat concentrate for use in making fat-in-water emulsions suitable for intravenous administration, and to methods for making such concentrate.

It has long been recognized in the medical art that it would be highly desirable to introduce fats into the vein for the purpose of providing calories to sustain a patient unable to ingest sufficient food. This is particularly true since it is recognized that the intravenous administration of sugars and hydrolyzed proteins often fails to provide sustaining quantities of calories. Fats, however, are known to produce more than twice as many calories per unit of weight as are produced by sugars and proteins and hence it is theoretically possible to introduce enough fats to provide a sustaining amount of calories for the patient.

Fat-in-water emulsions have been made up in great variety for intravenous administration but up to the present time none has been found that can be said to be sufficiently non-toxic and unchanged upon aging to satisfy the exacting requirements for a product of this type. Some emulsions when freshly made have been found to give a minimum of undesirable side reactions but in common with other emulsions of this type certain undesirable properties develop in said emulsions upon aging. These undesirable properties are thought to be related to hydrolysis of the components and agglomeration of fat globules to undesirably large size. For instance, in some of the previously known fat-in-water emulsions made for intravenous administration the lecithin employed therein as an emulsifying agent hydrolyzes upon aging with the formation of toxic by-products.

It is an object of this invention to provide a concentrate for use in making a fat emulsion suitable for intravenous administration to provide a high caloric product.

Another object of the invention is to provide a concentrate for use in making a fat emulsion suitable for intravenous administration which does not become toxic upon aging.

Another object of the invention is to provide a concentrate for making a stable, non-toxic fat emulsion suitable for intravenous administration and serving as a carrier for fat soluble and fat dispersible medicaments.

Still another object is to provide a method for preparing fats for intravenous administration by forming a stable concentrate of the fat with emulsifying agents and stabilizing agents.

Other objects and advantages of the invention will be more apparent upon a consideration of the following detailed description of the invention.

In the accomplishment of the foregoing objects and in accordance with the practice of the invention there is now provided a stable concentrate adapted for mixing with water to provide a fat-in-water emulsion suitable for intravenous administration. The composition comprises a fat and a substantially anhydrous physiologically acceptable polyhydric alcohol, diether thereof, or the polymeric ethylene ethers thereof having the recurring unit

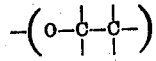

The composition also contains sufficient of an emulsifying agent to form a stable emulsion upon admixture with a physiologically acceptable aqueous medium.

It is contemplated that any suitable fat may be employed in the practice of the invention and in this regard it is intended that the term "fat" should be construed in its broad chemical sense—i.e., it is intended that both natural and synthetic fats may be employed and that the fat may take either a solid or liquid form (the liquid form is more commonly known as an oil but falls within the scope of the broader term "fat"). Cocoanut oil, cottonseed oil, corn oil, soybean oil, palm oil, peanut oil, sesame oil, safflower oil and like natural oils are all included within the scope of this invention. Higher melting fats may also be employed, such an animal fats, lard and beef fat. The hydrogenated and partially hydrogenated natural and synthetic fats are also suitable.

Both naturally occurring emulsifying agents such as the mono and di glycerides, bile acids, fatty acids and phosphatides found in the human body may be employed either alone or in combination to achieve the desired results. One may use lecithin and the hydroxylated and hydrogenated lecithins. When the term "lecithin" is used it is meant to cover commercial lecithin which may contain lesser amounts of other phosphatides such as cephalins. Polyglycerol esters of higher fatty acids (Drumulse, tradename) are also suitable.

As the anhydrous carrier of the composition one may employ a substantially anhydrous, physiologically acceptable polyhydric alcohol such as glycerin, propylene glycol and diglycerol. One may also use the liquid polyethylene glycols such as polyethylene glycol 200 and 400 (numbers indicating approximate molecular weight), as representative of the polymeric ethylene ethers of polyhydric alcohols having the recurring unit (—O—CH$_2$—CH$_2$—).

The proportions of the three essential components of the new composition may be varied over rather wide ranges so long as one does not introduce instability into the product. In one embodiment of the invention the polyhydroxy compound and the fatty material are employed in approximate ratio of 1:2 parts by volume. The emulsifying agent is present in a much smaller amount as is usual in the employment of these materials. Using the fatty component as the standard, for each part by volume thereof in the concentrate one must employ at least about 0.2 part by volume of polyhydric alcohol. Using the same standard, one may employ at least about 1/100 part w./v. of the phosphatide emulsifying agent.

On a weight basis the relative proportions of ingredients will be somewhat different depending on the specific gravity of the components, as will be apparent to one skilled in the art. For example, in one suitable composition I may use one part by weight of fat, about 0.6 part by weight of glycerin and 0.05 part by weight of lecithin.

The polyhydroxy compound may be used in any non-toxic amount which limit may be determined easily by routine experiment.

A certain amount of the polyhydroxy compound such as glycerin is necessary in the composition, and one may use additional quantities as desired. For instance, dextrose, fructose, sorbitol and the like may be added as diluents but not as substitutes for the critical minimum amount of glycerin.

It will be apparent that other components may be added to the concentrate for the purpose of inhibiting oxidation of the fats and further stabilizing it. Other ingredients may be added in small amounts to promote the action of the emulsifying agent. For instance, one may wish to add antioxidants such as the tocopherols, and bacteriostatic agents such as phenyl mercuric nitrate to preserve the sterility of the emulsions. It may also be desirable to add electrolytes, amino acids, vitamins, proteins and plasma expanders to the concentrate in the preparation of products having specifically designed properties.

The concentrates described herein make excellent carriers for fat soluble medicaments which are suitable for intravenous administration. For example, they are good carriers for vitamins K and K$_1$ and vitamins A and D, hormones, steroids, etc. Fat emulsions containing natural vitamin K provide an excellent means for combatting such conditions as overdosage of Dicumarol.

The following examples are presented in order to teach the invention more clearly and in the examples specific amounts of the various ingredients are given. It is to be understood, however, that the invention is not intended to be limited in any way by the specific disclosure in the examples.

*Example I*

The following ingredients are employed in the listed proportions:

Cocoanut oil _____ cc__ 100
Glycerin _____ cc__ 100
Soybean lecithin _____ grams__ 10

The three ingredients are blended in a Waring Blendor and are thoroughly agitated until a mixture of honey-like consistency is formed. Instead of a Waring Blendor one may use a colloid mill. Upon addition of 4 volumes of 5% dextrose solution per volume of mixture, an oil-in-water emulsion is formed. Because of the substantially anhydrous nature of this concentrate (before adding the water) the breakdown of the composition is minimized or prevented upon aging. After a year at room temperature there has been no noticeable change in the physical characteristics of the concentrate or of an emulsion made therefrom. The concentrate is prepared under non-sterile conditions and yet has consistently tested sterile. A product of this concentration of glycerin may have to be administered quite slowly to avoid hemolysis. Alternatively, small amounts may be given with a rest interval between.

*Example II*

The following ingredients are used in the listed proportions:

Cottonseed oil _____ cc__ 100
Glycerin _____ cc__ 100
Soybean lecithin _____ grams__ 10

The lecithin and glycerin are blended and the oil is added slowly with stirring, with the formation of a viscous, stable concentrate suitable for addition to water or aqueous dextrose solution to form a stable fat-in-water emulsion for intravenous administration.

*Example III*

The following ingredients are used in the listed proportions:

Cocoanut oil _____ cc__ 150
Glycerin _____ cc__ 100
Soybean lecithin _____ grams__ 15

The ingredients are blended as in the preceding examples to form a viscous, stable concentrate which forms a stable emulsion suitable for intravenous infusion.

*Example IV*

The following ingredients are used in the listed proportions:

Cocoanut oil _____ cc__ 100
Glycerin _____ cc__ 100
Liver lecithin _____ grams__ 10

The blending instructions of the preceding examples are followed to form a viscous, stable concentrate which forms a stable emulsion suitable for intravenous use.

*Example V*

The following ingredients are employed as indicated:

Cocoanut oil _____ g__ 100
Glycerin U.S.P. _____ g__ 130
Soybean lecithin _____ g__ 5

The materials are blended as in the preceding examples to form a viscous product which forms a stable emulsion when mixed with approximately 800 cc. of 5% dextrose solution. Said viscous product is stable to autoclaving.

*Example VI*

The following ingredients are employed as indicated:

Cocoanut oil _____ g__ 100
Glycerin (anhydrous, has only 0.5% water) __ g__ 130
Soybean lecithin _____ g__ 3

The lecithin and glycerin are blended and the oil is added slowly with stirring. A clear stable product of honey-like appearance and consistency is obtained which forms a stable emulsion on dilution with 5% dextrose solution.

*Example VII*

The following ingredients are employed as indicated:

Glycerin _____ g__ 130
Butter fat _____ g__ 100
Lecithin _____ g__ 5

The ingredients are mixed as in the preceding examples to form a concentrate which results in a stable emulsion on mixing with 5% dextrose.

*Example VIII*

The following ingredients are employed as indicated:

Sesame oil _____ g__ 100
Glycerin U.S.P. _____ g__ 130
Soybean lecithin _____ g__ 2.5
Glyceryl monooleate _____ g__ 2.5

The ingredients are mixed as in the preceding examples and the product obtained is a viscous concentrate which forms stable emulsions upon mixing with 5% dextrose or water for injection.

*Example IX*

The following ingredients are employed as indicated:

Glycerol _____ cc__ 30
Fructose _____ g__ 20
Oil _____ cc__ 100
Lecithin _____ g__ 5

Cocoanut or cottonseed oil is used herein and the preparation is made up as in previous examples. It is milled to a small droplet size and forms stable emulsions upon mixing with an injectable aqueous medium.

*Example X*

The following ingredients are employed as indicated:

Diglycerol _____ cc__ 50
Cocoanut oil _____ cc__ 100
Lecithin _____ g__ 7.5

These ingredients are compounded as in previous examples and make excellent emulsions. The amount of diglycerol may be doubled with the same results as in the case of glycerol.

Example XI

The following ingredients are employed as indicated:

| | | |
|---|---|---|
| Cocoanut oil | cc | 100 |
| Glycerol | cc | 50 |
| Fructose | g | 50 |
| Lecithin | g | 5 |

These ingredients compound into a stable concentrate that forms an excellent emulsion upon dilution with water. Glycose or sorbitol may be substituted for fructose in this formula.

Example XII

The following ingredients are employed as indicated:

| | | |
|---|---|---|
| Cottonseed oil | g | 100 |
| Glycerol | g | 60 |
| Lecithin | g | 5 |

A stable concentrate is formed of these ingredients and can be diluted with water to a good emulsion.

Example XIII

The following ingredients are employed as indicated:

| | | |
|---|---|---|
| Cocoanut oil | cc | 100 |
| Glycerol | cc | 50 |
| Lecithin | g | 5 |

Forms a stable concentrate suitable for dilution with water.

Example XIV

An excellent emulsion concentrate is prepared as follows:

| | | |
|---|---|---|
| Safflower oil | g | 100 |
| Glycerin | g | 80 |
| Lecithin | g | 5 |

The ingredients are blended as described in previous examples to form a stable, honey-colored, thick concentrate which constitutes readily with sterile water or 5% dextrose into an excellent stable emulsion.

Example XV

An emulsion concentrate is prepared as follows:

| | | |
|---|---|---|
| Safflower oil | g | 100 |
| Polyethylene glycol 400 | g | 80 |
| Lecithin | g | 5 |

Disperse the lecithin in the glycol and slowly add the oil with good mixing. Forms a stable emulsion concentrate that constitutes readily with water to form a stable emulsion.

Example XVI

An emulsion concentrate is prepared as follows:

| | | |
|---|---|---|
| Safflower oil | g | 100 |
| Propylene glycol | g | 40 |
| Glycerin | g | 40 |
| Lecithin | g | 5 |

Follow directions given in previous examples.

Example XVII

An emulsion concentrate is prepared as follows:

| | | |
|---|---|---|
| Safflower oil | g | 100 |
| Glycerin | g | 80 |
| Dextrose | g | 8 |
| Lecithin | g | 5 |

Follow directions given in previous examples.

The concentrates described herein have proven useful and effective in the preparation of fat-in-water emulsions suitable for intravenous administration both to animals and humans. When such an emulsion is infused into the subject, a response is obtained indicating that the subject is deriving calories from the product. For instance, when dogs are given injections of the emulsion, they maintain their weight even though their food intake is greatly restricted. Both in animals and in humans no harmful side effects could be attributed to the emulsion.

The term "substantially anhydrous" is used herein in connection with the polyhydric alcohols in order to include within the scope of the invention the commercially available polyhydric alcohols which may have a small amount of water naturally associated therewith. For instance, glycerin is hydroscopic and it is commercially difficult to remove the last traces of water therefrom, and it is not necessary in the practice of the invention to remove said last traces of water. U.S.P. glycerin may contain up to 7% water and this material is included within the scope of the term "substantially anhydrous." Stated in another way, the invention contemplates glycerin to which no additional water has been added.

This application is a continuation-in-part of my copending applications Serial No. 681,160, filed August 30, 1957, and Serial No. 583,377, filed May 8, 1956, which was a continuation-in-part of my then copending application Serial No. 514,755, filed June 10, 1955. All the foregoing applications are now abandoned.

Others may practice this invention in any of the numerous ways which will be suggested to one skilled in the art upon a reading of this disclosure. All such practice of the invention is intended to be covered hereby provided it falls within the scope of the appended claim.

I claim:

A concentrate composition suitable for admixture with physiologically acceptable aqueous media for intravenous administration comprising one part by weight of safflower oil, about 0.8 part by weight of glycerin, and about 1/120 as much lecithin w./v. as oil.

References Cited in the file of this patent

UNITED STATES PATENTS

| | | |
|---|---|---|
| 2,463,738 | Bernhart | Mar. 8, 1949 |

FOREIGN PATENTS

| | | |
|---|---|---|
| 759,009 | France | Jan. 27, 1934 |
| 107,587 | Austria | Apr. 14, 1943 |

OTHER REFERENCES

Eisman: J.A.P.A., Sci. Ed., November 1943, pp. 659–662.

Zilversmit et al.: J. Lab. and Clin. Med., 48:3, pp. 386–391, September 1956.

Webster's New International Dictionary, 2nd ed., Unab., p. 1693, Safflower Oil, Merriam Co., 1940.

Freeman: Q. Bull., Northwestern U., Med. School, 28:2, pp. 113–123, Summer 1954.

Holman et al.: Progress in the Chem. of Fats and Other Lipids, vol. 3, pp. 2–17, 1955, Pergammon Press, N.Y.

Moeller et al.: J. Lab. and Clin. Med., 46:3, pp. 450–460, September 1955.

Waddell et al.: J. Lab. and Clin. Med., 45:5, pp. 697–710, May 1955.

UNITED STATES PATENT OFFICE

CERTIFICATION OF CORRECTION

Patent No. 2,972,565                         February 21, 1961

Donald B. Zilversmit

It is hereby certified that error appears in the above numbered patent requiring correction and that the said Letters Patent should read as corrected below.

Column 6, line 40, for "1/120" read -- 1/20 --.

Signed and sealed this 8th day of August 1961.

(SEAL)
Attest:

ERNEST W. SWIDER
Attesting Officer

DAVID L. LADD
Commissioner of Patents